UNITED STATES PATENT OFFICE.

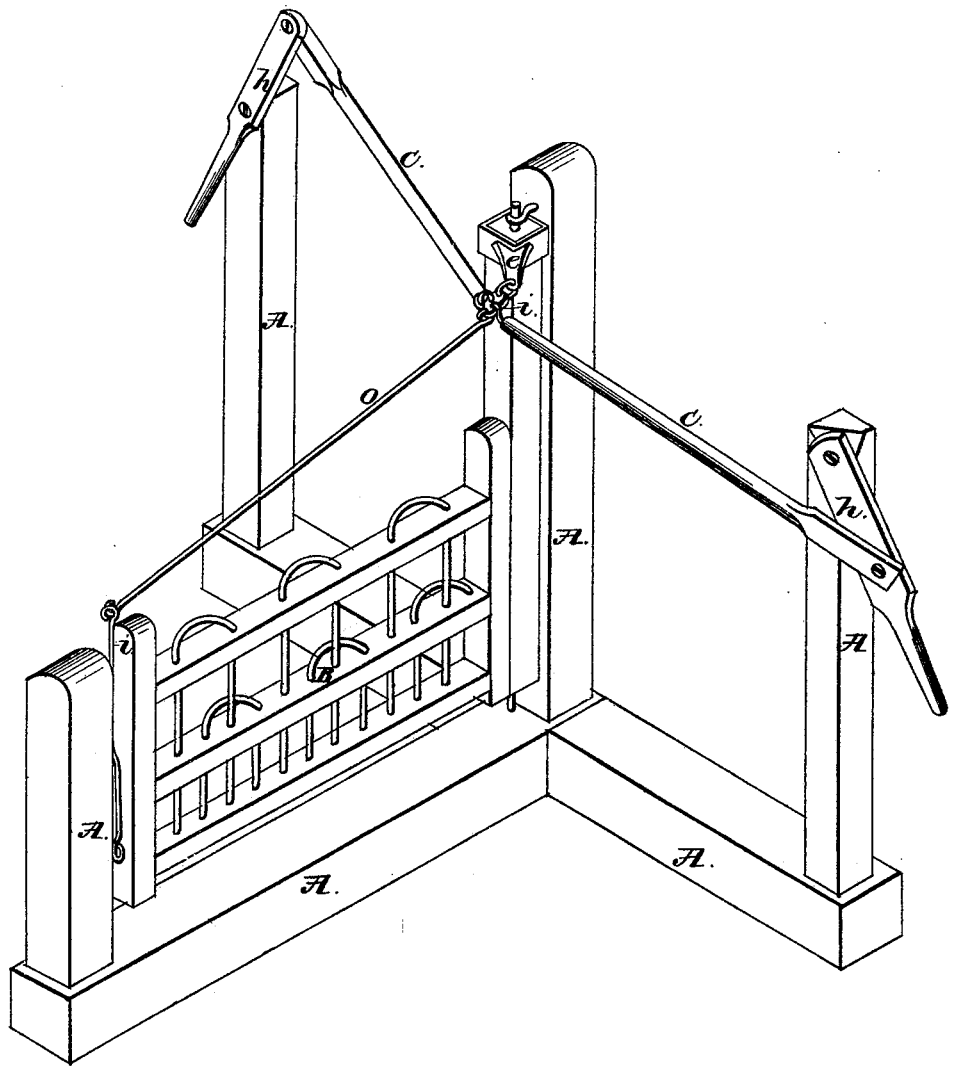

HENRY P. HASKIN, OF BELOIT, WISCONSIN.

IMPROVEMENT IN GATES.

Specification forming part of Letters Patent No. 176,470, dated April 25, 1876; application filed February 23, 1876.

*To all whom it may concern:*

Be it known that I, HENRY P. HASKIN, of the city of Beloit, in the county of Rock and State of Wisconsin, have invented certain new and useful Improvements in Farm-Gates; and I do hereby declare that the following is a full, clear, and exact description thereof, which will enable others skilled in the art to which it appertains to make and use the same, reference being had to the accompanying drawing, and to the letters of reference marked thereon, which form a part of this specification.

Similar letters of reference indicate corresponding parts.

The drawing consists of a single perspective view of my improved gate, showing the whole device complete, in which letter A represents the whole frame of the gate and posts pertaining thereto, as shown. B represents an ordinary swing-gate. $h\ h$ are hand-levers pivoted to posts A and horizontal bars $c\ c$, as shown. $i$ is a center plate connecting the bars $c$, miter-lever $e$, and rod $o$; and $l$ is a spring-latch, actuated by the rod $o$, all as shown in the drawing.

The gate frame and posts are of ordinary construction, and the posts to which the levers $h$ are pivoted are set at suitable distance from either approach to the gate, and the bars $c$ are of corresponding length.

The gate is operated as follows: When the gate is approached from either direction, by carrying the lower end of either of the levers $h$ toward the gate, the latter will swing open in the opposite direction, and close by reverse action upon either of said levers $h$. The bars $c$ are connected to the miter-lever $e$, which is rigidly fixed to the upper end of the heel-post of the gate B by means of a link connecting the center plate $i$, with which suitable hooks on the inner ends of the bars $c$ engage loosely, the rod $o$ in like manner connecting the latch $l$ and center plate $i$, all as shown, so that when the bars $c$ are moved in either direction the center plate $i$ is sufficiently deflected laterally so that the rod $o$ is drawn backward, disengaging the latch $l$ from the catch, and the action upon the lever $h$ being continued in the same direction, the gate is caused to open or close, as and in the manner before described. Suitable latch-posts may be provided for holding the gate open.

Having thus fully described the construction and manner of operating my improved gate, what I claim as new, and desire to secure by Letters Patent, is—

The levers $h$, bars $c$, miter-lever $e$, center plate $i$, rod $o$, and latch $l$, constructed and arranged, in relation to the gate B, substantially as and for the purpose specified.

In testimony that I claim the foregoing as my own invention, I affix my signature in presence of two witnesses.

HENRY P. HASKIN.

Witnesses:
 JOHN REIGART,
 W. T. CRIM.